(12) United States Patent
Jain

(10) Patent No.: US 11,645,098 B2
(45) Date of Patent: May 9, 2023

(54) SYSTEMS AND METHODS TO PRE-PROVISION SOCKETS FOR SERVERLESS FUNCTIONS

(71) Applicant: SAP SE, Walldorf (DE)

(72) Inventor: Shashank Mohan Jain, Bangalore (IN)

(73) Assignee: SAP SE, Walldorf (DE)

( * ) Notice: Subject to any disclaimer, the term of this patent is extended or adjusted under 35 U.S.C. 154(b) by 242 days.

(21) Appl. No.: 16/950,111

(22) Filed: Nov. 17, 2020

(65) Prior Publication Data

US 2022/0156097 A1 May 19, 2022

(51) Int. Cl.
| | |
|---|---|
| *G06F 9/455* | (2018.01) |
| *G06F 9/445* | (2018.01) |
| *H04L 67/10* | (2022.01) |
| *H04L 69/326* | (2022.01) |
| *G06F 17/16* | (2006.01) |
| *G06F 16/25* | (2019.01) |

(52) U.S. Cl.
CPC .......... *G06F 9/45533* (2013.01); *G06F 9/445* (2013.01); *G06F 17/16* (2013.01); *H04L 67/10* (2013.01); *H04L 69/326* (2013.01); *G06F 16/252* (2019.01)

(58) Field of Classification Search
CPC ...... G06F 9/5061; G06F 11/302; G06F 21/53; G06F 9/4887; G06F 9/5077; G06F 9/545; H04L 69/16; H04L 69/161
See application file for complete search history.

(56) References Cited

U.S. PATENT DOCUMENTS

| | | | | |
|---|---|---|---|---|
| 10,649,861 | B1 * | 5/2020 | Natanzon | H04L 12/66 |
| 11,044,173 | B1 * | 6/2021 | Mestery | H04L 47/127 |
| 11,106,480 | B2 * | 8/2021 | Wang | H04L 61/5007 |
| 11,108,629 | B1 * | 8/2021 | Cahyadi | G06F 9/45558 |
| 11,422,844 | B1 * | 8/2022 | Filiz | G06F 9/45558 |
| 2009/0083756 | A1 * | 3/2009 | Kim | G06F 9/545 719/312 |
| 2019/0199759 | A1 * | 6/2019 | Anderson | G06Q 50/20 |
| 2019/0384655 | A1 * | 12/2019 | Krishna Singuru | G06F 9/542 |
| 2020/0241903 | A1 * | 7/2020 | Wang | H04L 41/12 |
| 2021/0026692 | A1 * | 1/2021 | Mestery | H04L 61/4511 |
| 2021/0110506 | A1 * | 4/2021 | Prakash | G06F 9/4887 |

(Continued)

*Primary Examiner* — Mahran Y Abu Roumi
(74) *Attorney, Agent, or Firm* — Buckley, Maschoff & Talwalkar LLC

(57) ABSTRACT

Methods and systems may be associated with a cloud computing environment. A serverless function orchestrator may execute a socket activation for a VM to pre-provision a TCP socket (e.g., setting up virtual interfaces and creating socket structures) before the VM hosts any serverless function associated with the pre-provisioned TCP socket. After this socket activation, the orchestrator may receive a request for a first serverless function and, responsive to the received request, start the first serverless function on the VM using the pre-provisioned TCP socket. After the activation and prior to starting the first serverless function, the system may queue packets received in connection with the pre-provisioned TCP socket. In some embodiments, multiple TCP sockets, each associated with a VM, may activated before any serverless functions are hosted and the first serverless function is started on a VM selected based on information in a serverless function experience data store.

16 Claims, 11 Drawing Sheets

(56) References Cited

U.S. PATENT DOCUMENTS

2021/0184942 A1\* 6/2021 Tootaghaj ............... H04L 41/16
2021/0263779 A1\* 8/2021 Haghighat ............ G06F 9/5061
2022/0038355 A1\* 2/2022 Chen ....................... H04L 41/40

\* cited by examiner

1

SYSTEMS AND METHODS TO PRE-PROVISION SOCKETS FOR SERVERLESS FUNCTIONS

BACKGROUND

An enterprise may utilize a cloud computing environment that runs virtual machines to let users perform tasks. For example, the enterprise might let various users execute serverless functions in the cloud computing environment to process purchase orders, adjust human resources information, generate invoices, etc. When a serverless function is initially assigned to a virtual machine, it typically incurs a certain amount of overhead as it "spins up" (e.g., including launching a container, setting up Linux namespaces, cgroups, etc.). Moreover, when multiple virtual machines are available the serverless function is randomly assigned to one of those machines—even when that particular assignment might not result in the best overall system performance. It would therefore be desirable to facilitate execution of serverless functions for a cloud computing environment in a secure, automatic, and efficient manner.

SUMMARY

According to some embodiments, methods and systems may be associated with a cloud computing environment. A serverless function orchestrator may execute a socket activation for a VM to pre-provision a TCP socket (e.g., setting up virtual interfaces and creating socket structures) before the VM hosts any serverless function associated with the pre-provisioned TCP socket. After this socket activation, the orchestrator may receive a request for a first serverless function and, responsive to the received request, start the first serverless function on the VM using the pre-provisioned TCP socket. After the activation and prior to starting the first serverless function, the system may queue packets received in connection with the pre-provisioned TCP socket. In some embodiments, multiple TCP sockets, each associated with a VM, may activated before any serverless functions are hosted and the first serverless function is started on a VM selected based on information in a serverless function experience data store.

Some embodiments comprise: means for executing, by a computer processor of a serverless function orchestrator, a socket activation for a virtual machine to pre-provision a Transmission Control Protocol ("TCP") socket before the virtual machine hosts any serverless function associated with the pre-provisioned TCP socket; after said socket activation, means for receiving a request for a first serverless function; and responsive to the received request, means for starting the first serverless function on the virtual machine using the pre-provisioned TCP socket.

Some technical advantages of some embodiments disclosed herein are improved systems and methods to facilitate execution of serverless functions for a cloud computing environment in a secure, automatic, and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Note that serverless functions are typically realized as a container or a micro Virtual Machine ("VM") may face two substantial problems. First, every execution of a function (if the function is not already hot) needs to spin up a container and do required setup tasks such as creating a virtual network interface, mounting a file system, etc. to run those functions. This can add a substantial amount of overhead to the overall spin up time of the function. Also, the provisioning of serverless functions may need the presence of an API gateway or a load-balancer in front. This means that when a request comes to API gateway, the function is spun on a network endpoint. This takes time to load the network endpoint and then execute the function. Such an approach can cause latency and lead to an undesirable experience for tenants consuming the serverless function.

Figure 1:
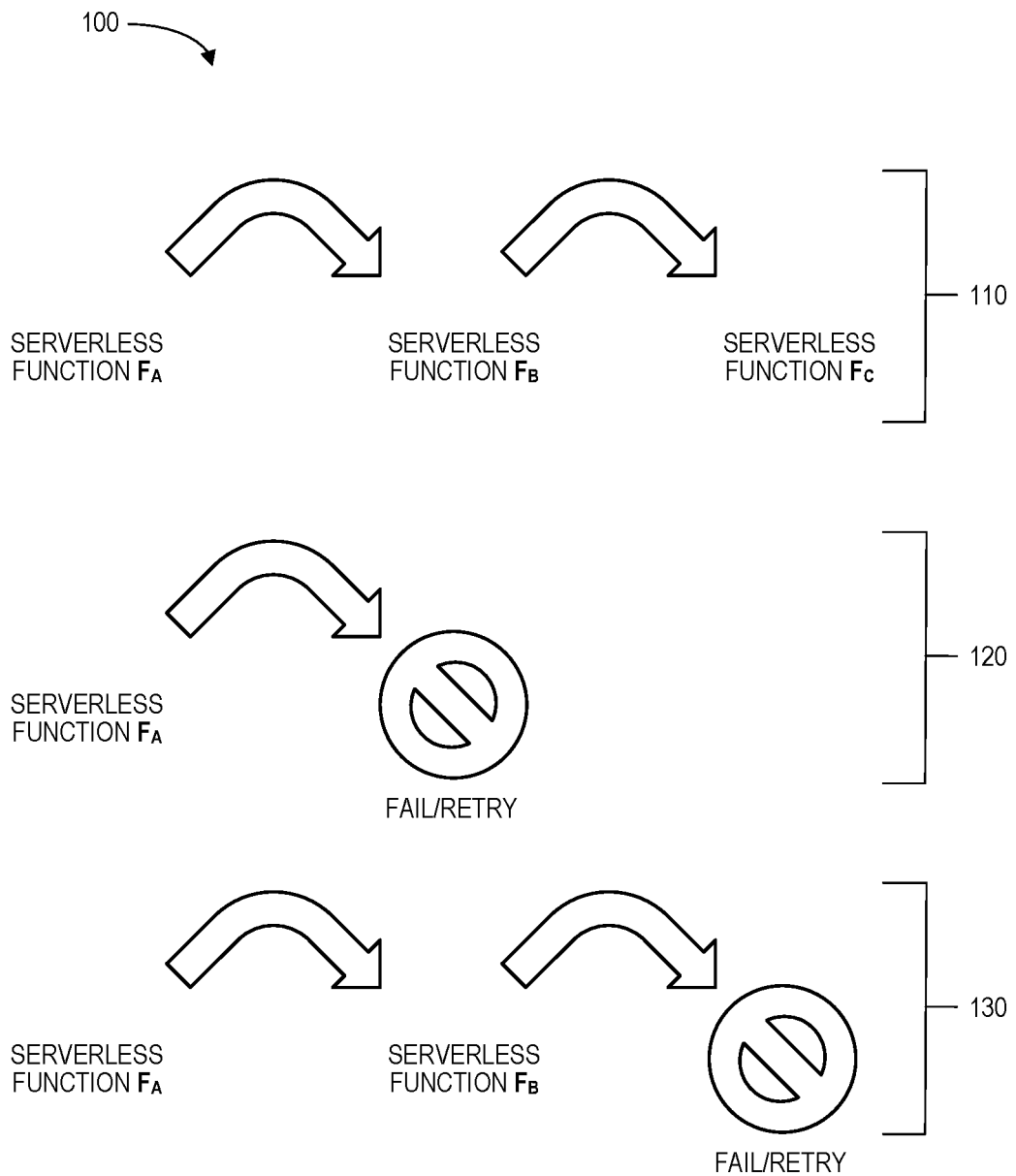
FIG. 1 illustrates an example of serverless functions.

For example, FIG. 1 illustrates 100 a series 110 of serverless functions, where function FA calls function FB which, in turn, calls function Fc. When function FA is initially started 120, function FB will not yet exist. As a result, calls from function FA to function FB will generate failures and/or re-try attempts (degrading system performance). Similarly, when function FB eventually begins 130, function Fc will not yet exist. As a result, calls from function FB to function Fc will again result in failures and/or re-try attempts (further degrading system performance).

A second problem with serverless functions is that when a serverless function is provisioned (e.g., via platforms like Knative or by infrastructure providers such as AWS® from AMAZON® or Azure from MICROSOFT®), the system may take the availability of resources into consideration when making a placement decision. This might be based, for example, on algorithms such as bin packing (or something similar) to decide which machine or node will execute a specific function. If there are multiple machines available with the needed resources, a machine is chosen randomly and the workload (e.g., the function) is placed there. This approach may neglect important performance aspects such as how well (or poorly) a function has performed on a machine having a specific type of configuration. It does not, for example, take into account that there might be machines that could render a better experience for a function in terms of the execution environment.

Moreover, as the number of deployments of Kubernetes grows and the deployment of serverless runtimes such as Knative (e.g., Kyma from SAP®), Kubeless, and other serverless platforms increases, the need for faster bootup times and optimized placements will become even more important.

Some embodiments described herein may tackle both of these two problems with a pluggable solution which can hook into the serverless orchestrators like Knative, Kubeless, or similar implementations. Some embodiments are targeted towards serverless platforms based on Kubernetes (as it provides extensibility to hook in the plugin as part of the orchestration workflow). In some cases, the component may be built as a library (which can either be invoked in memory or invoked by a webhook over a Representational State Transfer ("REST") endpoint). Such an approach may be re-usable and deployment may be left to the discretion of the platform based on need (and should not impact the codebase of the platform in any way).

Figure 2:
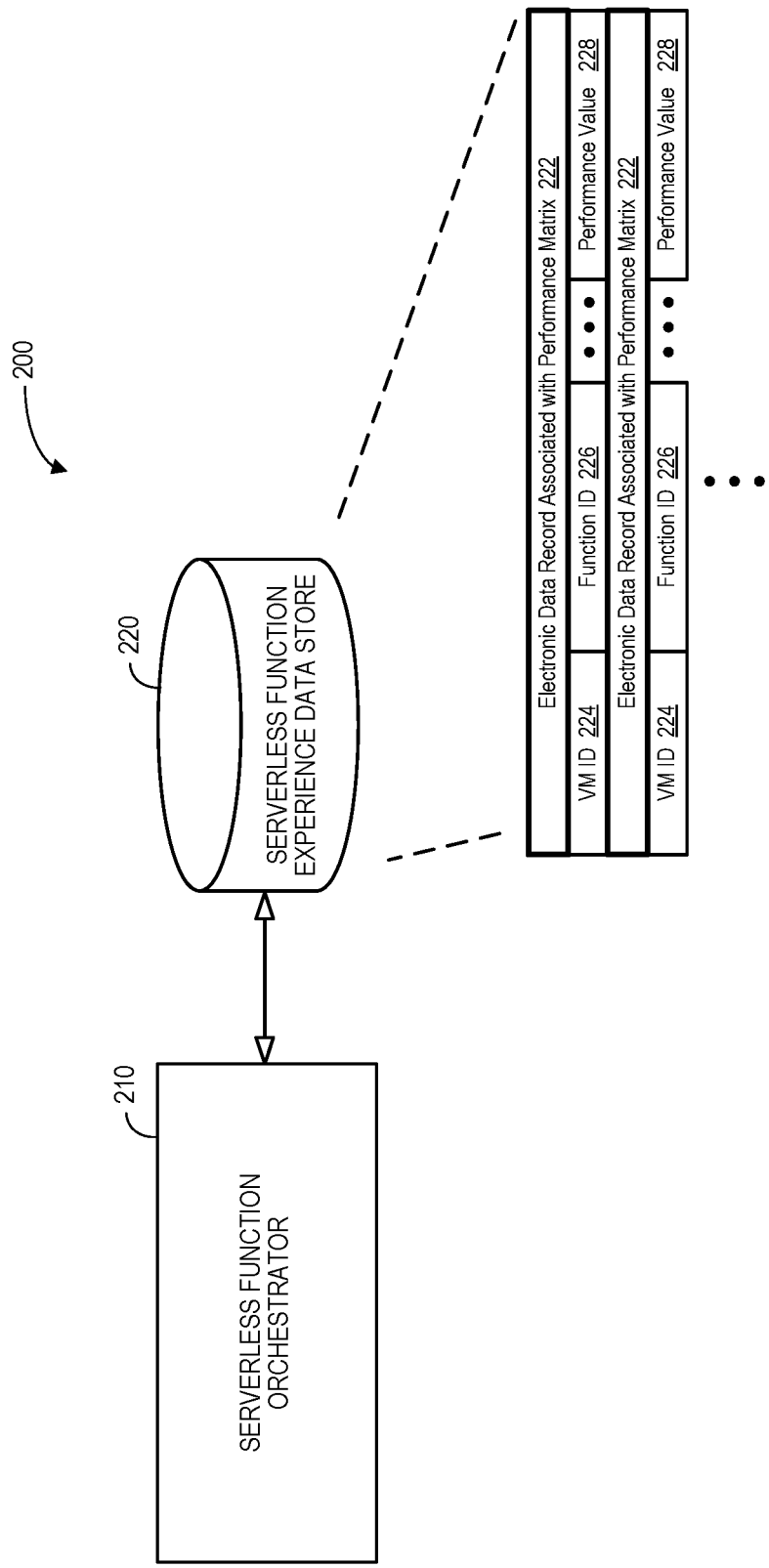
FIG. 2 is a high-level block diagram of a system in accordance with some embodiments.

FIG. 2 is a high-level block diagram of a system 200 in accordance with some embodiments. The system 200 includes a serverless function orchestrator 210 that accesses information in a serverless function experience data store 220. The serverless function orchestrator 210 might use this information, for example, to help start VMs for a cloud computing application. The process might be performed automatically or be initiated via a command from a remote operator interface device. As used herein, the term "automatically" may refer to, for example, actions that can be performed with little or no human intervention.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The serverless function orchestrator 210 may store information into and/or retrieve information from various data stores (e.g., the serverless function experience data store 220), which may be locally stored or reside remote from the serverless function orchestrator 210. Although a single serverless function orchestrator 210 and serverless function experience data store 220 are shown in FIG. 2, any number of such devices may be included. Moreover, various devices described herein might be combined according to embodiments of the present invention. For example, in some embodiments, the serverless function experience data store 220 and the serverless function orchestrator 210 might comprise a single apparatus. The system 200 functions may be performed by a constellation of networked apparatuses, such as in a distributed processing or cloud-based architecture.

A user or administrator may access the system 200 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define how systems interact) and/or provide or receive automatically generated recommendations or results from the system 200. The serverless function experience data store 220 may contain electronic data records 222 associated with a performance matrix (e.g., with each record containing a VM identifier 224, a function address 226, a performance value 228, etc.).

Figure 3:
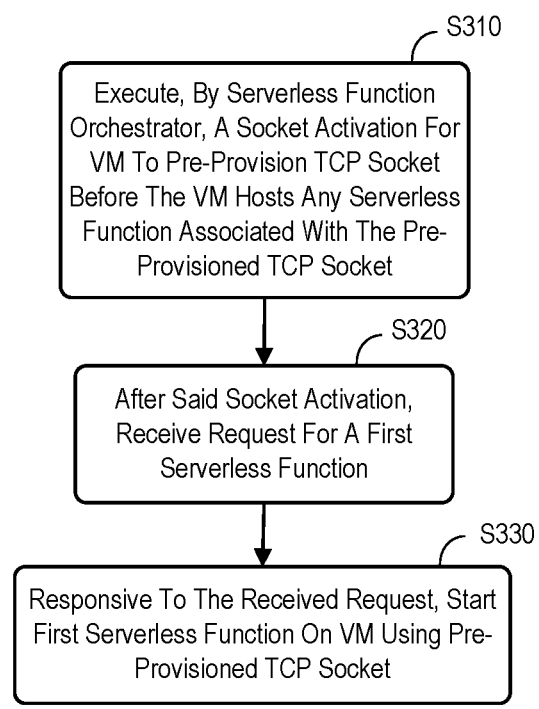
FIG. 3 is a method according to some embodiments.

FIG. 3 is a method that might performed by some or all of the elements of the system 200 described with respect to FIG. 2. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a computer processor of a serverless function orchestrator may execute a socket activation for a VM to pre-provision a Transmission Control Protocol ("TCP") socket before the VM hosts any serverless function associated with the pre-provisioned TCP socket. For example, executing the socket activation may involve setting up virtual interfaces and creating socket structures within a kernel. After said socket activation, at S320 the system may receive a request for a first serverless function. For example, receiving a request for the first serverless function might be associated with a client request received via an Application Programming Interface ("API") gateway.

Responsive to the received request, at S330 the system may start the first serverless function on the VM using the pre-provisioned TCP socket. For example, starting the first serverless function might be associated with loading specific function code on a Web Assembly ("WASM") module to achieve multi-tenancy for the cloud computing environment. According to some embodiments, starting the first serverless function is associated with an implementation of a Container Runtime Interface Open Container Initiative ("CRI-O") process. Note that after said activation of S320 and prior to starting the first serverless function at S330, the system may queue packets received in connection with the pre-provisioned TCP socket.

Figure 4:
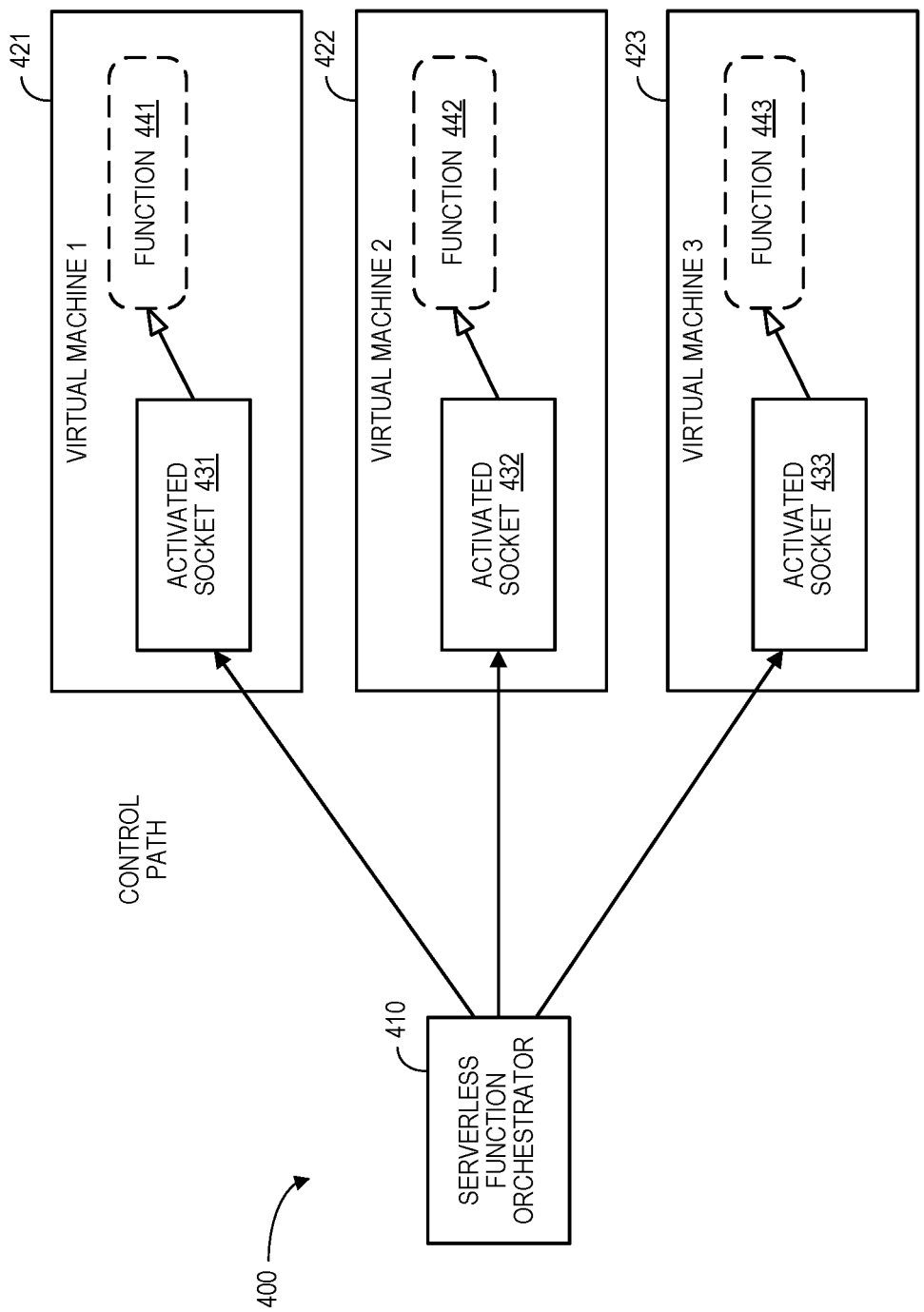
FIG. 4 is a control path implementation in accordance with some embodiments.

FIG. 4 is a control path 400 implementation in accordance with some embodiments. In particular, a serverless function orchestrator 410 communicates with three VMs 421, 422, 423. Embodiments may use a Linux feature called "socket activation" to separate sockets 431, 432, 433 from the actual business functionality of the function 441, 442, 443. This means that a TCP socket may be created separate from the actual code functionality. As a result, embodiments may decouple network functionality from the business logic (note that a substantial amount of time for any function is wasted in creating and setting up network infrastructure, such as setting up virtual interfaces and creating socket structures within a kernel).

Embodiments may use socket activation to-pre provision or activate TCP sockets 431, 432, 433 on that machines 421, 422, 423 that will eventually host the functions 441, 442, 443 (as illustrated by dashed lines in FIG. 4). When a request for a function is eventually received, the function code is started on a machine. Until this code is launched, the activated socket will queue packets and thereby guarantee that requests are not lost. Because the actual function doesn't need to create anything related to the network or the TCP layer it can spin up relatively quickly. In some embodiments, a pre-provisioned socket activation mechanism such as systemd may be utilized.

Figure 5:
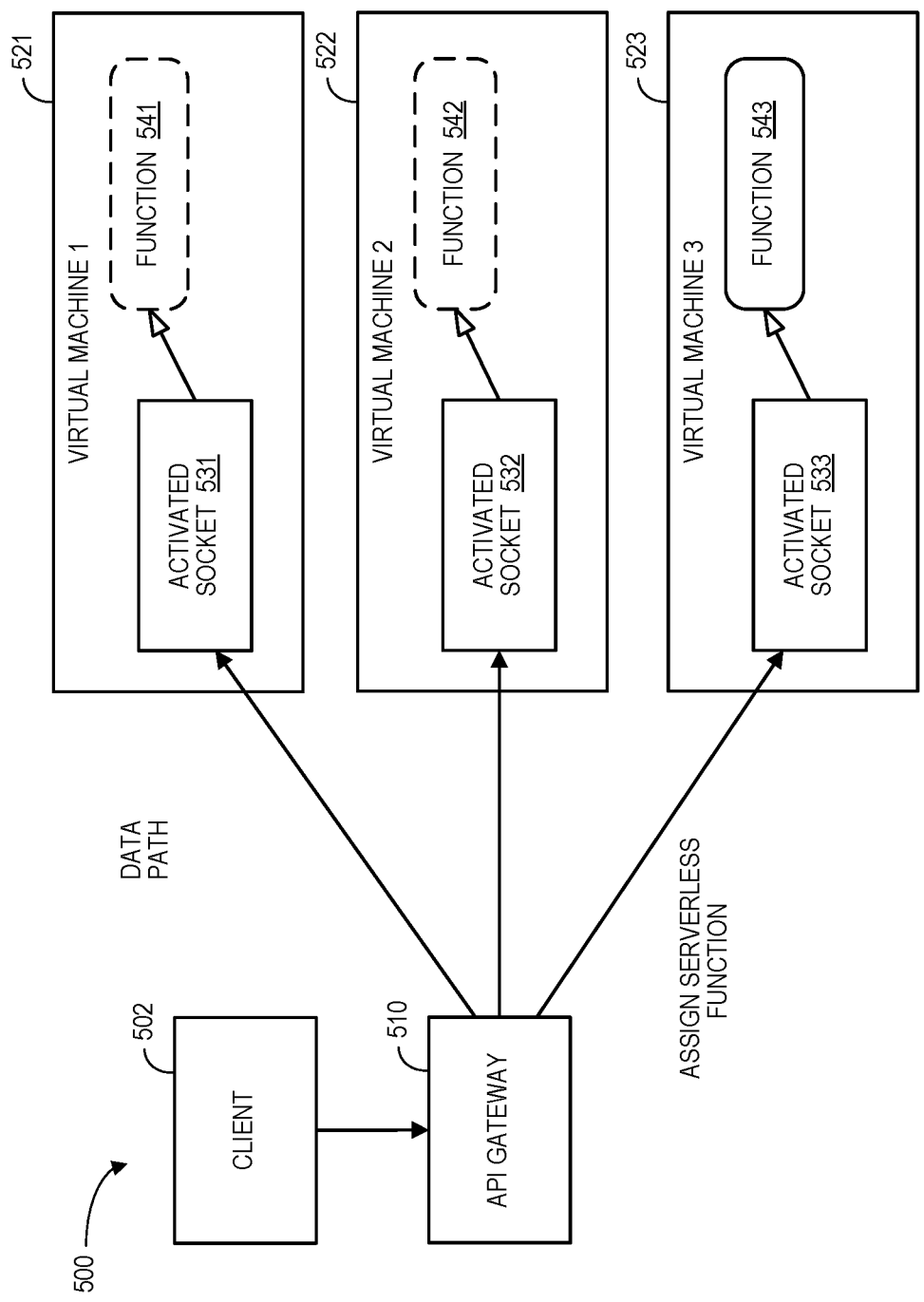
FIG. 5 is a data path implementation according to some embodiments.

FIG. 5 is a data path 500 implementation according to some embodiments. In particular, an API gateway 510 may communicate with a client 502 and three VMs 421, 422, 423. A socket 531, 532, 533 has been already activated on each VM 421, 422, 423. When a client 502 requests a function, it can then be started using a socket (e.g., function 543 is started using activated socket 533 as illustrated by the solid line in FIG. 5). On the data path 500, a tenant client 502 request may be passed via the API gateway 510 to an activated socket 531, 532, 533 which can load the specific function code in its own Web Assembly ("WASM") module to achieve multi-tenancy. Until the function is loaded, request packets may be queued in the activated socket. Such an approach may:

reduce the runtime code of a function and remove the responsibility of setting up the network and sockets; and by pre-provisioning the socket, the system may achieve a faster spin up time for a function.

Note that Kubernetes has extension points in the orchestration lifecycle that can be used to provision socket activated workloads. For example, the system may provide an implementation of CRI-O as a container runtime interface. This may allow for a hook in the provisioning path of the container. An orchestrator may communicate to the Kubelet (an agent process that runs on all Kubernetes nodes) to create a container (and at runtime the Kubelet may communicate to the CRI-O implementation to spin up the container). Note that a custom CRI-O implementation may, instead of spinning a full container on the first request of a specific function, create a socket (which can be kept for a long time and thereby the network setup cost is only incurred once) and just execute the function code every time the function is invoked. This will add to the fast spin up time of the function as the load increases.

Figure 6:
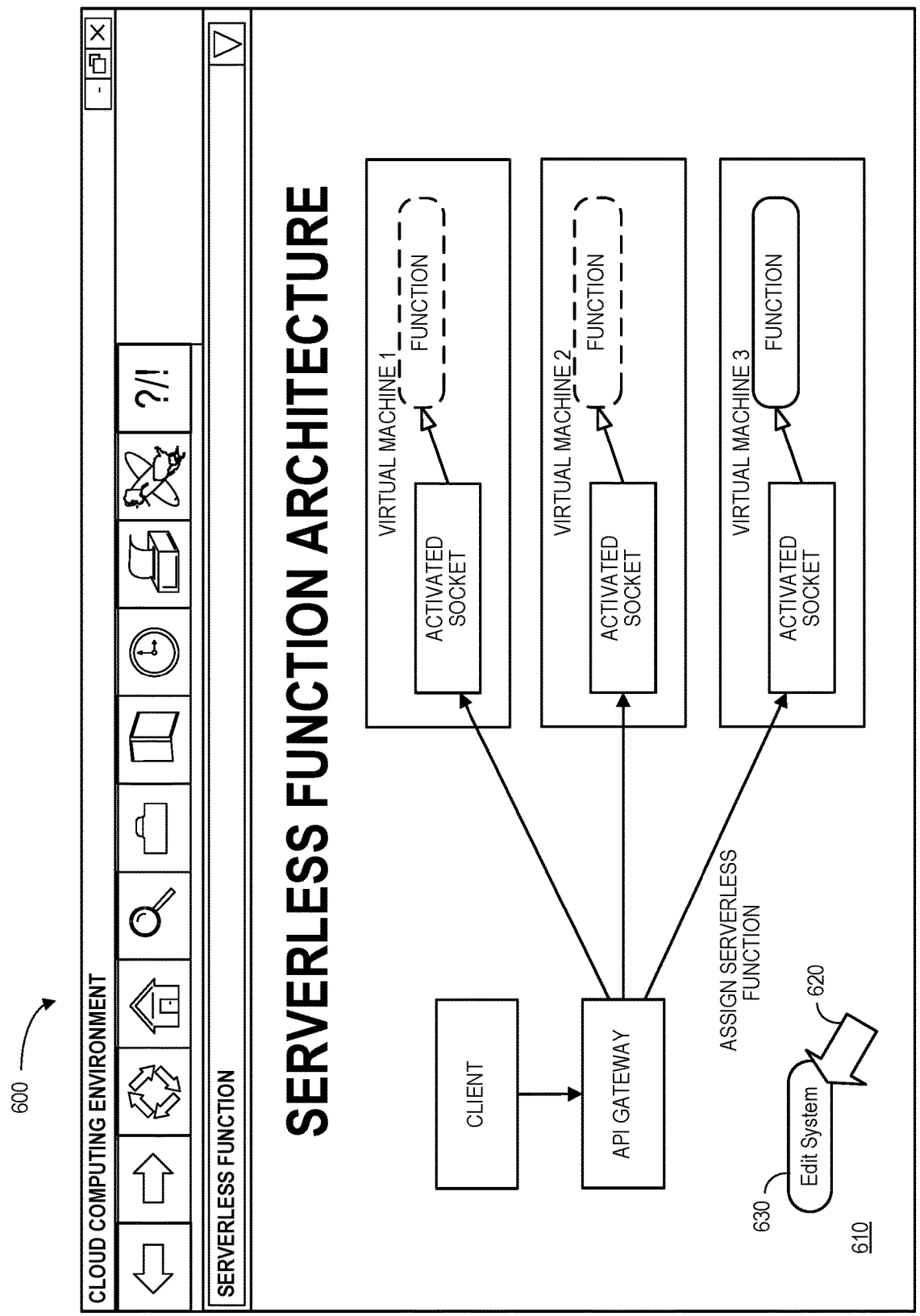
FIG. 6 is a user interface display according to some embodiments.

FIG. 6 is serverless function orchestrator display 600 according to some embodiments. The display 600 includes a graphical representation 610 of the elements of a system in accordance with any of the embodiments described herein. Selection of an element on the display 600 (e.g., via a touchscreen or a computer pointer 620) may result in display of a popup window containing more detailed information about that element and/or various options (e.g., to add a data element, modify a mapping, etc.). Selection of an "Edit System" icon 630 may let an operator or administrator change a performance parameter optimization algorithm, etc.

Figure 7:
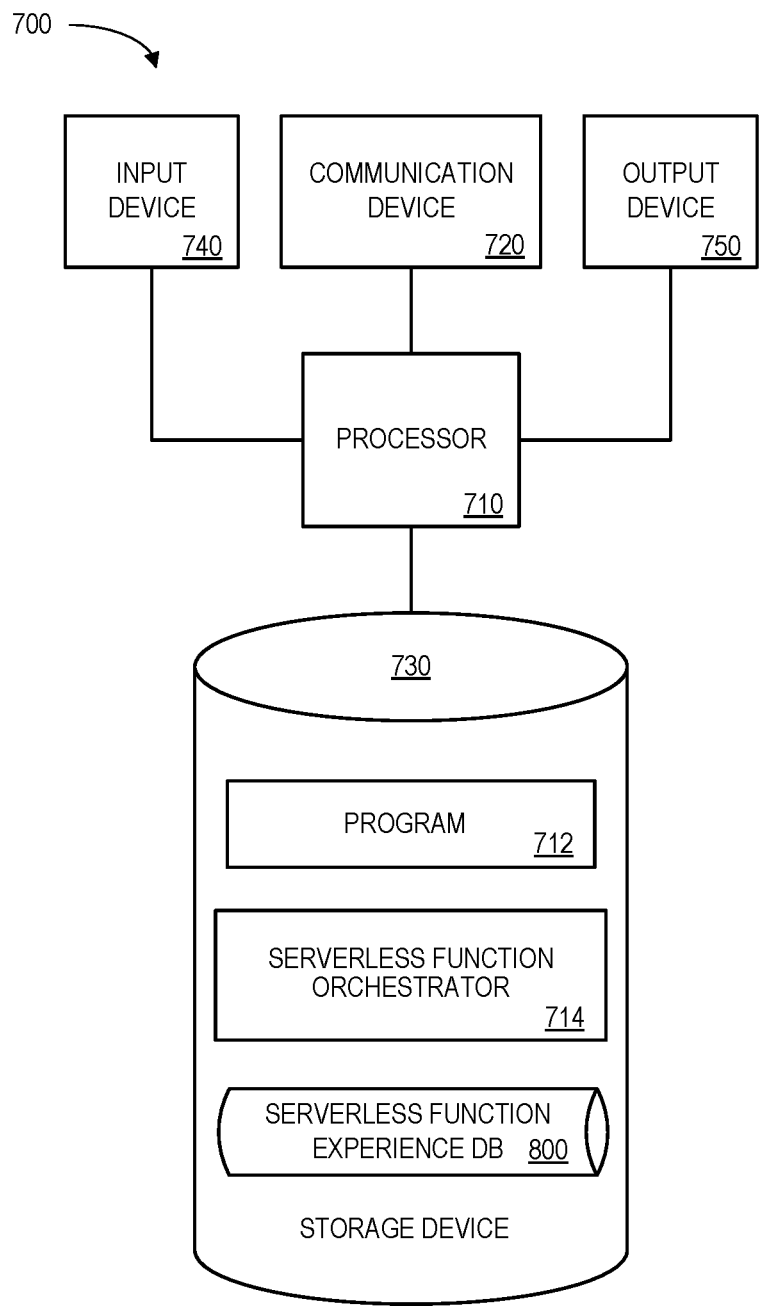
FIG. 7 is an apparatus or platform according to some embodiments.

Note that the embodiments described herein may also be implemented using any number of different hardware configurations. For example, FIG. 7 is a block diagram of an apparatus or platform 700 that may be, for example, associated with the systems 200, 400, 500 of FIGS. 2, 4, 5 respectively (and/or any other system described herein). The platform 700 comprises a processor 710, such as one or more commercially available Central Processing Units ("CPUs") in the form of one-chip microprocessors, coupled to a communication device 760 configured to communicate via a communication network (not shown in FIG. 7). The communication device 760 may be used to communicate, for example, with one or more remote user platforms, administrator platforms, etc. The platform 700 further includes an input device 740 (e.g., a computer mouse and/or keyboard to input cloud computing information) and/an output device 750 (e.g., a computer monitor to render a display, transmit recommendations, and/or create reports about VMs, sockets, performance parameters, etc.). According to some embodiments, a mobile device, monitoring physical system, and/or PC may be used to exchange information with the platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a serverless function orchestrator 714 for controlling the processor 710. The processor 710 performs instructions of the programs 712, 714, and thereby operates in accordance with any of the embodiments described herein. For example, the processor 710 may execute a socket activation for a VM to pre-provision a TCP socket (e.g., setting up virtual interfaces and creating socket structures) before the VM hosts any serverless function associated with the pre-provisioned TCP socket. After this socket activation, the processor 710 may receive a request for a first serverless function and, responsive to the received request, start the first serverless function on the VM using the pre-provisioned TCP socket. After the activation and prior to starting the first serverless function, the processor 710 may queue packets received in connection with the pre-provisioned TCP socket. In some embodiments, multiple TCP sockets, each associated with a VM, may activated before any serverless functions are hosted and the first serverless function is started on a VM selected based on information in a serverless function experience database.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores the serverless function experience database 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Figure 8:
FIG. 8 is portion of a serverless function experience data store in accordance with some embodiments.

Referring to FIG. 8, a table is shown that represents the serverless function experience database 800 that may be stored at the platform 700 according to some embodiments. The table may include, for example, entries associated with past executions of serverless functions in a cloud computing environment. The table may also define fields 802, 804, 806, 808, 810 for each of the entries. The fields 802, 804, 806, 808, 810 may, according to some embodiments, specify: a performance identifier 802, a description 804, a VM identifier 806, a serverless function identifier 808, and a performance value 810. The serverless function experience database 800 may be created and updated, for example, when functions are executed, new types of performance parameters are added to the system, etc.

The performance identifier 802 might be a unique alphanumeric label that is associated with a parameter being measured (e.g., bootup speed, latency, resource utilization, etc.) and the description 804 may describe the parameter. The VM identifier 806 may identify a machine that previously executed the particular serverless function identifier 808, and the performance value 810 might indicate how well (or poorly) the function was performed by that machine.

The information in the serverless function experience database 800 may then be used to optimize the placement of future functions on future virtual machines. That is, in some embodiments, the placement model may be extended via a simple matrix factorization based recommendation model (collaborative recommendation) to provide a better choice based on the prior "experience" of a function on a certain machine (or type of machine). Note that the experience of a function (container) on a VM can be a represented by multi-variate variables. Examples of performance variables include:

how fast the function started (bootup time);
latency of execution (how fast the client got back a response); and
resource utilization (e.g., memory utilization, CPU utilization, IO utilization, network utilization, etc.).

Figure 9:
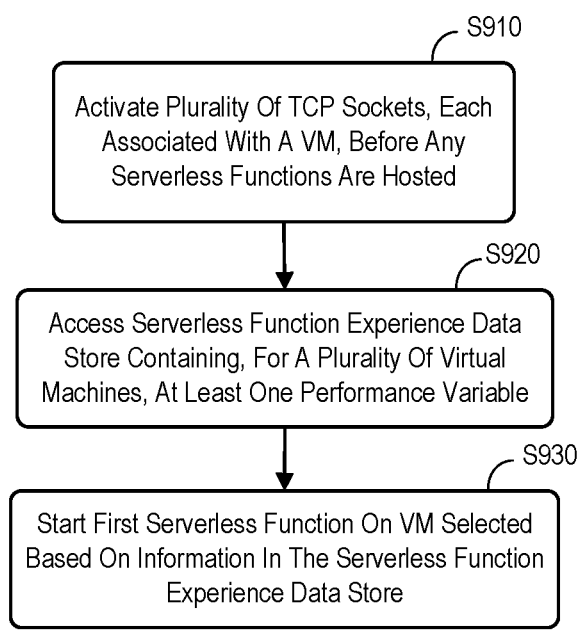
FIG. 9 is a placement optimization method according to some embodiments.

FIG. 9 is a placement optimization method according to some embodiments. At S910, the system may activate a plurality of TCP sockets, each associated with a VM, before any serverless functions are hosted. At S920, the system may access a serverless function experience data store that contains, for a plurality of VMs, at least one performance value. According to some embodiments, the system may then start a first serverless function at S930 on a VM selected to optimize performance based on information in the serverless function experience data store. The serverless function experience data store may comprise, for example, a matrix with a plurality of serverless function performance variables for each virtual machine. Moreover, the serverless function experience data store may include a plurality of matrixes each associated with a different performance variable (e.g., bootup time, execution latency, resource usage, memory usage, CPU usage, IO usage, network usage, etc.). Moreover, each matrix may be factorized to derive latent features of serverless functions and virtual machines.

Figure 10:
FIG. 10 is a serverless function spin up time experience matrix according to some embodiments.

For example, FIG. 10 is a serverless function spin up time experience matrix 1000 according to some embodiments. Based on historical execution of functions on a set of VMs, a matrix may be for the experience of each function on an individual VM. The idea is to create a matrix of functions and VMs based on the past experiences (one matrix for each experience). Each matrix may be factorized to derive latent features of functions and VMs to start giving recommendations about machines (even those on which a function has never been placed) as to whether they are more suitable for a particular function as compare to the random assignments that are currently performed.

As shown in the matrix 1000, there are functions (denoted by $F_1, F_2, F_3, \ldots, F_{10}$) and five VMs (denoted by $V_1, V_2,$ $V_3, V_4, V_5$). The above function experience matrix 1000 may be a sparse matrix which reflects how a certain function, when placed on a certain VM, has a specific experience. The experience might vary due to multiple factors, such as a noisy neighbor, resources available at a certain point on the VM, etc. The matrix 1000 may clearly exhibit a state where many functions have not seen or rather experienced a certain VM (illustrated by a "?" in FIG. 10). For example, assume function $F_3$ has experienced VM $V_1$, $V_2$, and $V_3$ but never experienced VM $V_4$ or $V_5$. Now, based on the matrix 1000, the system may decompose the experience matrix 1000 to determine latent factors that will tend to recommend, for function $F_3$, whether VM $V_4$ or $V_5$ would be more likely to provide a better experience. Similar experience matrixes may be created and decomposed for other experience parameters, and then a weighted average of the different experience factors can be used to recommend a VM for a function. According to some embodiments, Artificial Intelligence ("AI") or Machine Learning ("ML") may be used to analyze data and make recommendations as appropriate. The experience matrix 1000 can be revised periodically and then decomposed (since this is a low overhead process).

According to some embodiments, placement logic is hooked into scheduling hooks provided by Kubernetes. As part of the scheduling workflow, the scheduler may invoke recommendation logic (built as a library) to check whether, for a particular function, it can find a VM with a better experience if it needs to select one of several available VMs with similar capabilities. Generally, the orchestrator will pick the first available VM. In some embodiments, the component is an add on that is pluggable and reusable, and the provisioners of a platform can decide to use it without any changes to the code of the actual platform.

Thus, embodiments may facilitate execution of serverless functions for a cloud computing environment in a secure, automatic, and efficient manner. Use of Knative, such as in SAP® Kyma, may benefit from both faster execution and the optimized placement of serverless functions. These features may add to a better customer experiences on cloud computing environments.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
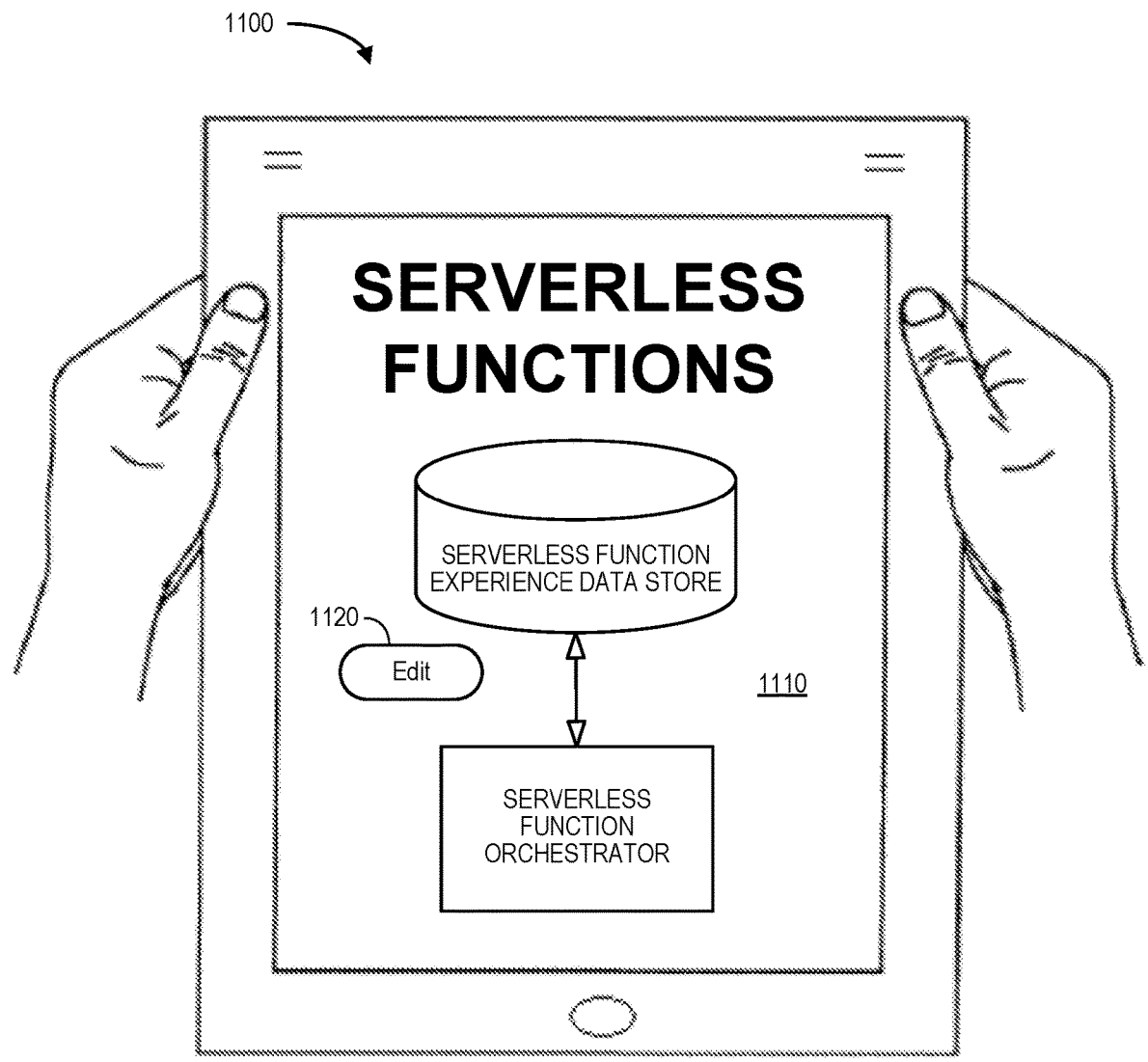
FIG. 11 is a tablet computer rendering a serverless function display in accordance with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of serverless functions, any of the embodiments described herein could be applied to other types of serverless functions. Moreover, the displays shown herein are provided only as examples, and any other type of user interface could be implemented. For example, FIG. 11 illustrates a handheld tablet computer 1100 showing a serverless function display 1110 according to some embodiments. The serverless function display 1110 might include user-selectable data that can be selected and/or modified by a user of the handheld computer 1100 (e.g., via an "Edit" icon 1120) to view updated information about performance metrics, cloud applications, virtual machines, etc.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
   a serverless function orchestrator, including:
      a computer processor, and
      computer memory, coupled to the computer processor, storing instructions that, when executed by the computer processor cause the processor to:
         (i) execute socket activations for a plurality of virtual machines to pre-provision Transmission Control Protocol ("TCP") sockets, each associated with a virtual machine, before any serverless functions are hosted,
         (ii) after said socket activations, receive a request for a first serverless function, and
         (iii) responsive to the received request, start the first serverless function on a virtual machine using a pre-provisioned TCP socket; and
   a serverless function experience matrix, coupled to the serverless function orchestrator, containing, for each of the plurality of virtual machines, a plurality of functions such that each entry in the matrix represents how a particular function previously performed on a particular virtual machine, wherein the first serverless function is started on a virtual machine selected based on information in the serverless function experience matrix.

2. The system of claim 1, wherein after said activations and prior to starting the first serverless function, queuing packets received in connection with the pre-provisioned TCP socket.

3. The system of claim 1, wherein starting the socket activation involves setting up virtual interfaces and creating socket structures within a kernel.

4. The system of claim 1, wherein said receiving a request for the first serverless function is associated with a client request received via an Application Programming Interface ("API") gateway.

5. The system of claim 1, wherein said starting the first serverless function is associated with loading specific function code on a Web Assembly ("WASM") module to achieve multi-tenancy for the cloud computing environment.

6. The system of claim 1, wherein said starting the first serverless function is associated with an implementation of a Container Runtime Interface Open Container Initiative ("CRI-O") process.

7. The system of claim 1, wherein a serverless function experience data store comprises a plurality of matrixes each associated with a different performance variable.

8. The system of claim 7, wherein the performance variables are associated with: (i) bootup time, (ii) execution latency, (iii) resource usage, (iv) memory usage, (v) Central Processing Unit ("CPU") usage, (vi) Input Output ("IO") usage, and (vii) network usage.

9. The system of claim 8, wherein each matrix is factorized to derive latent features of serverless functions and virtual machines.

10. A computer-implemented method associated with a cloud computing environment, comprising:
   executing, by a computer processor of a serverless function orchestrator, socket activations for a plurality of virtual machines to pre-provision Transmission Control Protocol ("TCP") sockets, each associated with a virtual machine, before any serverless functions are hosted;
   after said socket activation, receiving a request for a first serverless function;
   selecting a virtual machine for the first serverless function based on information in a serverless function experience matrix that contains, for each of the plurality of virtual machines, a plurality of functions such that each entry in the matrix represents how a particular function previously performed on a particular virtual machine; and
   responsive to the received request, starting the first serverless function on the selected virtual machine using a pre-provisioned TCP socket.

11. The method of claim 10, further comprising, after said activations and prior to starting the first serverless function:
   queuing packets received in connection with the pre-provisioned TCP socket.

12. The method of claim 10, wherein starting the socket activation comprises:
   setting up virtual interfaces; and
   creating socket structures within a kernel.

13. The method of claim 10, wherein said receiving a request for the first serverless function is associated with a client request received via an Application Programming Interface ("API") gateway.

14. The method of claim 10, wherein said starting the first serverless function is associated with loading specific function code on a Web Assembly ("WASM") module to achieve multi-tenancy for the cloud computing environment.

15. A non-transitory, computer readable medium having executable instructions stored therein that, when executed by a computer processor cause the processor to perform a method associated with a cloud computing environment, the method comprising:
   executing, by a computer processor of a serverless function orchestrator, socket activations for a plurality of virtual machines to pre-provision Transmission Control Protocol ("TCP") sockets, each associated with a virtual machine, before any serverless functions are hosted;
   after said socket activation, receiving a request for a first serverless function;
   selecting a virtual machine for the first serverless function based on information in a serverless function experience matrix that contains, for each of the plurality of virtual machines, a plurality of functions such that each entry in the matrix represents how a particular function previously performed on a particular virtual machine; and
   responsive to the received request, starting the first serverless function on the selected virtual machine using a pre-provisioned TCP socket.

16. The medium of claim 15, wherein a serverless function experience data store comprises a plurality of matrixes each associated with a different performance variable including: (i) bootup time, (ii) execution latency, (iii) resource usage, (iv) memory usage, (v) Central Processing Unit ("CPU") usage, (vi) Input Output ("IO") usage, and (vii) network usage.

* * * * *